March 8, 1966  G. CROMPTON III  3,239,228

GOLF BALL

Filed June 21, 1962

INVENTOR.
George Crompton 3d
BY
Ralph Hammar
Attorney

United States Patent Office 3,239,228
Patented Mar. 8, 1966

3,239,228
GOLF BALL
George Crompton III, Erie, Pa., assignor to Lord
Corporation, a corporation of Pennsylvania
Filed June 21, 1962, Ser. No. 204,128
8 Claims. (Cl. 273—218)

This invention is a golf ball molded of polybutadiene rubber with high sulfur which meets the official standards. The ball may have either a coating of white paint or a conventional cover.

Figure 1:
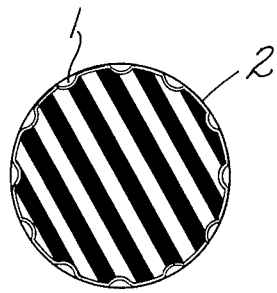
Figure 2:
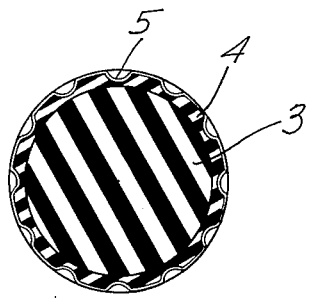

In the drawing, FIG. 1 is a section through a golf ball having a coating of white paint and FIG. 2 is a section through a golf ball having the conventional cover.

The FIG. 1 golf ball is vulcanized in one piece with a suitably dimpled outer surface 1 coated with paint 2. In the FIG. 2 golf ball the body 3 of the ball is vulcanized in one piece and is enclosed by a conventional cover 4 having a dimpled outer surface 5, coated with white paint. Both of the golf balls have the dimensions, weight and elasticity required by the official standards. The FIG. 1 golf ball is cheaper to make because there is no cover. The FIG. 2 golf ball may have somewhat greater durability due to the toughness of the cover.

A typical compound for the body of the golf ball comprises in parts by weight:

Polybutadiene _____ 100
Compounding ingredients:
    Sulfur, vulcanizing ingredient _____ 18–24
    Low specific gravity filler (preferably flour of
      hardwood of known good resilience such as
      maplewood flour) _____ 16–24
    Reinforcing agents _____ 15
    Miscellaneous ingredients such as 1.5 stearic
      acid, 15 oil, 5 zinc oxide, 2 antioxidant ___ 21.5
    Whitening ingredients (not necessary if the
      ball has a cover) _____ 10
    Accelerators and activators such as 4-triethanolamine,
2.1 accelerator _____ 6.1

The polybutadiene is the important ingredient for the resilience. The greatest resilience is obtained from a polybutadiene stereo controlled to the configuration 35% cis, 58% trans and 7% 1–2. These figures are subject to variation. The cis may be as little as 25% to as much as 100%; the trans may range from 0% to over 60%. The 1–2 configuration is not important. It merely occurs to a minor extent in the polymer. The trans configuration in the polybutadiene polymer does not appear essential. The best polymers have the configuration 35–60% cis, 33–52% trans and the balance 1–2. Of this group, the configuration 35% cis and 52% trans is superior. Acceptable polymers have up to 100% cis and from 0–60% trans.

The sulfur content is unusual. Ordinary rubber has a sulfur content of from 1 to 4 parts per hundred of rubber. In hard rubber compounds the sulfur content is from 25 to 40 parts per hundred of rubber. The sulfur content for the golf ball composition is high compared to ordinary rubber and low compared to hard rubber.

The wood flour is a filler which controls the specific gravity. A flour of wood having high resilience, such as maple, is better than wood flours of soft woods. However, the resilience is primarily obtained from the polybutadiene polymer so that considerable freedom of choice is open. A filler in the form of a flour is preferred because it is uniformly dispersed throughout the body of the golf ball. Uniform dispersion insures good balance so the ball will fly true. The wood flour is less dense than the polybutadiene polymers and allows compensation for the high density of fillers such as zinc oxide, etc. If the official standards were changed to permit heavier golf balls, the wood filler could be omitted.

The remaining ingredients, the whiteners, the reinforcing agents, the mixing ingredients, the accelerator and the antioxidant, are conventional. These ingredients which may be termed "compounding ingredients" facilitate the manufacture and improve the stability of the vulcanized compound in known ways. These ingredients are subject to wide variation both in amount and kind and for reasons which have to do with convenience of manufacture, durability, appearance, and the like, rather than the performance of the golf ball.

If there were no official standards controlling the size, weight and rebound of the golf ball, the body of the golf ball would consist of 100 parts stereo controlled polybutadiene, 18 to 24 parts sulfur and the balance of compounding ingredients aiding the mixing, vulcanizing, durability, and the like.

The paint of the FIG. 1 golf ball not only provides the whiteness but it may also increase the hardness and toughness of the surface of the ball. For this purpose, urethane paint is preferred. The cover of the FIG. 2 golf ball is conventional. Any of the known covers may be used.

In golf balls, the click is an esthetic quality which the playing public demands. This demand is based on past experience and on the emotional association of a good click with a good hit of the golf ball. The golf balls disclosed above have the desired click. The click is a property of the polybutadiene polymer. Uncured polybutadiene without other ingredients, rolled into a ball, bounces with the desired click. Because of the inherent click, polybutadiene, cured or uncured, makes an excellent center for conventional wound golf balls. Or, from another aspect, the golf ball body disclosed above may be the center of a conventional golf ball.

What is claimed as new is:

1. A golf ball of size, spherical shape and weight to comply with the standard rules for golfing having a homogeneous unitary vulcanized body consisting essentially of the following composition: polybutadiene, 100 parts by weight; sulfur, 18–24 parts by weight; and compounding ingredients, balance of the composition.

2. The golf ball of claim 1 having in addition a wood flour filler for adjusting the specific gravity.

3. The golf ball of claim 1 having a paint coating on the body.

4. The golf ball of claim 1 in which the polybutadiene is stereo controlled to a configuration of 35–60% cis, 33–58% trans and the balance 1–2 configuration.

5. The golf ball of claim 1 in which the polybutadiene is stereo controlled to a configuration of 25–100% cis, 0–65% trans and the balance 1–2 configuration.

6. A golf ball of size, spherical shape and weight to comply with the standard rules for golfing having its central portion consisting essentially of polybutadiene stereo controlled to a configuration of 35–60% cis, 33–58% trans and the balance 1–2 configuration.

7. A golf ball of size, spherical shape and weight to comply with the standard rules for golfing having its central portion consisting essentially of polybutadiene stereo controlled to a configuration of 25–100% cis, 0–65% trans and the balance 1–2 configuration.

8. The golf ball of claim 1 having a cover on the body.

References Cited by the Examiner

UNITED STATES PATENTS

| | | | |
|---|---|---|---|
| 2,175,685 | 10/1939 | Dieterich | 273—230 X |
| 2,643,125 | 6/1953 | Juve | 117—161 |
| 2,797,923 | 7/1957 | Dettman | 273—82 |

FOREIGN PATENTS

| | | |
|---|---|---|
| 494,031 | 10/1938 | Great Britain. |
| 796,134 | 6/1958 | Great Britain. |
| 827,365 | 3/1960 | Great Britain. |

OTHER REFERENCES

Organic Chemistry, 3rd edition, by Fieser and Feiser, Reinhold Publishing Corp., New York, 1956, D 251 FS C.2.

RICHARD C. PINKHAM, *Primary Examiner.*

JAMES W. LOVE, *Examiner.*